(No Model.)

J. WILSON.
SADDLE OR SEAT FOR BICYCLES.

No. 505,620. Patented Sept. 26, 1893.

Witnesses
Anna M. Dolloff
Geo. F. Chandler.

Inventor
James Wilson
by Henry Chadbourn
his Atty.

UNITED STATES PATENT OFFICE.

JAMES WILSON, OF SOMERVILLE, MASSACHUSETTS.

SADDLE OR SEAT FOR BICYCLES.

SPECIFICATION forming part of Letters Patent No. 505,620, dated September 26, 1893.

Application filed August 22, 1892. Serial No. 443,740. (No model.)

*To all whom it may concern:*

Be it known that I, JAMES WILSON, a citizen of the United States, and a resident of Somerville, in the county of Middlesex and State of Massachusetts, have invented certain new and useful Improvements in Saddles or Seats for Bicycles, of which the following, taken in connection with the accompanying drawings, is a specification.

This invention relates to improvements in saddles or seats for bicycles and has for its object to provide an easy riding, strong and durable saddle; to provide novel means whereby the tension or strain on the saddle may be easily adjusted to suit the different riders; also to so attach the saddle to its supporting springs as to cause it to be capable of a rocking or tilting movement forward or backward in order to assume the easiest position for the rider according to whether he is riding on level ground or up or down an incline, which position differs with different riders,—that is to say, one rider may require more or less of an incline to the seat than is required by another rider, and one of the objects of my invention is to provide means whereby the seat will automatically tilt so as to assume the desired position.

The invention is carried out as follows, reference being had to the accompanying drawings forming a part of this specification, and whereon—

Figure 1:
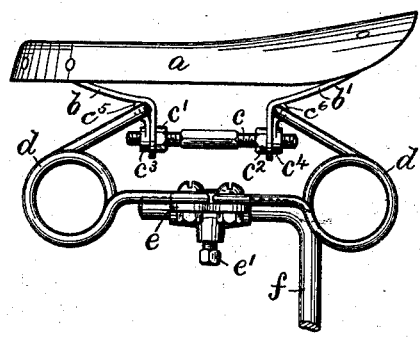
Figure 6:
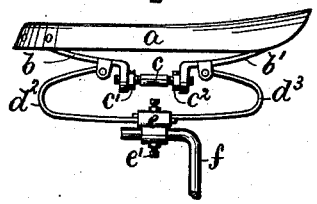
Figure 2:
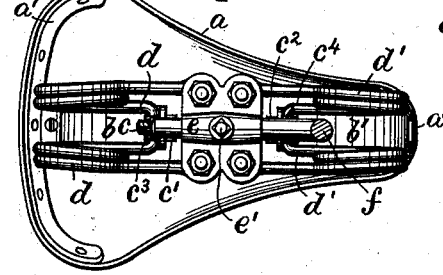
Figure 7:
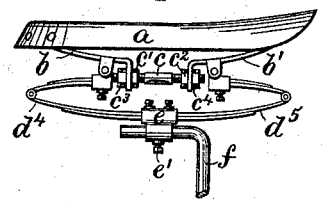
Figure 3:
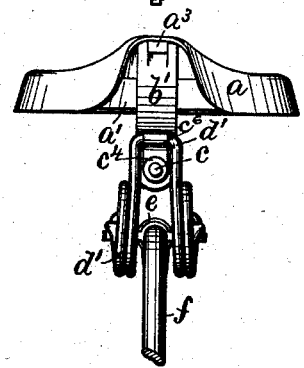
Figure 4:
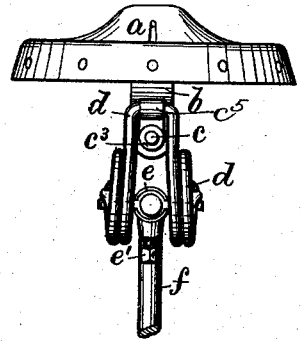
Figure 5:
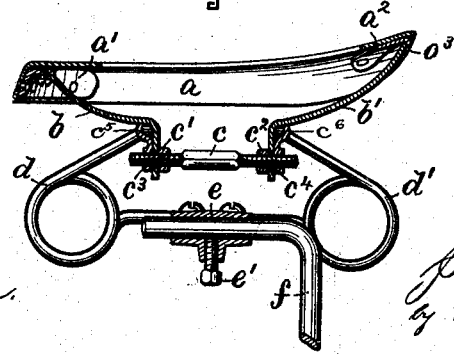

Figure 1 represents a side elevation of my improved saddle or seat showing a portion of the frame of the bicycle to which it is attached. Fig. 2 represents a bottom view of the same. Figs. 3 and 4 represent respectively a front and a rear elevation of the same. Fig. 5 represents a central longitudinal section of the saddle, and Figs. 6 and 7 represent, in side elevations, modified forms of my invention.

Similar letters refer to similar parts on the different parts of the drawings.

The seat proper $a$ is made of leather or other suitable materials and is preferably provided at either end with reinforcing pieces $a'\ a^2$ as usual. To the piece $a'$ is firmly attached the seat support $b$. The piece $a^2$ is preferably provided with a hook or projection $a^3$ against which the seat support $b'$ rests when the saddle is in position for use. These supports are made in the form of thin metallic strips or brackets and are provided at their lower ends with perforations through which the tension or spreader rod $c$ is inserted, which rod is provided at one end with a right screw thread and at the opposite end with a left screw thread, and also with the nuts $c'\ c^2$ screwed upon the screw threaded ends of the rod between the supports, and resting against the same, as shown on the drawings.

The rod $c$ is preferably made so as to allow it to be turned in its bearings in the supports $b\ b'$ by means of a suitable wrench for a purpose to be described hereinafter.

The nuts $c'\ c^2$ rest against the inner surfaces of the seat supports while nuts $c^3\ c^4$ are screwed upon the rod against the outside of said supports. The nuts $c^3\ c^4$ are provided respectively with upward projections $c^5\ c^6$ which are so arranged as to form bearings in which the upper ends of the springs $d\ d'$ are free to turn. These springs are firmly attached at their lower ends to a block $e$, which block is secured to the post $f$ or to any other desired part of the frame of the bicycle by means of the set screw $e'$ as shown.

I desire here to state that I do not wish to confine myself to the mechanism shown for pivotally attaching the springs to the seat supports $b, b'$ nor said supports to the seat proper $a$; neither do I wish to confine myself to the manner of rigidly attaching the springs to the framework of the machine, as such mechanisms may be varied at will within the scope of mechanical skill and to suit different circumstances without departing from my invention.

The pivotal connections between the springs and the seat supports are brought sufficiently close together within the length of the seat, the bight or loop of the forward spring projecting in front of its pivotal connection to the seat, and the bight or loop of the rear spring projecting to the rear of its connection to the seat, so as to make the seat very sensitive to the variations in the relative positions of the bicycles, and a person seated thereon and the consequent shifting of the center of gravity of said person in relation to said seat. This sensitiveness of the seat causes it to tilt easily forward or backward and to automatically adjust itself to the position occupied by the rider,—that is to say:—When a rider is ascending an incline he retains the same position which he occupied while on level ground, but his bicycle assumes an incline corresponding to that which he is ascending. Consequently the center of gravity of his body is moved forward over the seat and an increased pressure is brought to bear on the forward part of the saddle with a corresponding decrease on the rear portion of the same, which causes the saddle to rock forward, and to keep the same relative position to the rider that it occupied while on level ground. The opposite will be the case when the rider is descending an incline. This tilting of the seat increases the ease of the person who rides the bicycle.

In order to adjust the tension or strain on the seat, to suit the tastes of different riders, it is only necessary to loosen the nuts $c'$ $c^2$ by turning them on the rod $c$ nearer to the center of the rod and then to turn the rod by means of a wrench applied thereto, so as to either increase or diminish the distance between the nuts $c^3$ $c^4$ on the rod $c$ according to whether it is desired to increase or diminish the tension on the seat. After the nuts $c^3$ $c^4$ have been adjusted to the desired position on the rod the nuts $c'$ $c^2$ are turned so as to press firmly against their respective seat supports $b$ or $b'$ clamping the supports between the nuts $c'$ $c^2$ and $c^3$ $c^4$. By this arrangement the supports are spread more or less on the rod $c$ and the tension on the seat increased or diminished according to the wishes of the rider. This adjustment of the tension is very easily and quickly accomplished by my improved device above described.

I do not wish to confine myself to the exact mechanism shown for spreading the supports on the rod $c$ as the same may be varied within the scope of mechanical skill without departing from the spirit of my invention, as for instance, the perforations in the supports may be provided with screw threads to correspond with the screw threads on the ends of the rods and the nuts $c^3$ $c^4$ dispensed with if so desired, as shown in Fig. 6.

The form of springs used on my improved saddle is not essential to the working of the same, as coiled "rat-trap" springs, as shown in Figs. 1, 2, 3, 4 and 5 may be used and are considered preferable, but flat springs $d^2$ $d^3$ as shown in Fig. 6 may be used, or "leaf" or carriage springs, $d^4$ $d^5$ as shown in Fig. 7 may be used if so desired.

It will be obvious to any mechanic that my improved mechanism for obtaining the forward and backward tilting motion to the seat may be used with or without the tension adjusting mechanism for the seat and also that the tension adjusting mechanism may be used independent of the seat tilting mechanism without departing from my invention.

Having thus fully described the nature, construction, and operation of my invention, I wish to secure by Letters Patent and claim—

A saddle or seat for bicycles, consisting of the saddle or seat proper $a$, seat supports $b$ and $b'$ attached to the front and rear ends respectively of the seat, extending inward toward the center of the same, a spreader rod $c$ with nuts $c'$, $c^2$, $c^3$, and $c^4$ to adjust the tension of the seat substantially as set forth; a block $e$ adjustably mounted upon the seat post of the bicycle and the front and rear springs $d$ and $d'$ rigidly attached to their lower ends to the block $e$ and at their upper ends pivotally attached respectively at the inner ends of the supports $b$ and $b'$, whereby the seat is capable of a tilting motion to adjust it to the position of the rider in relation to the bicycle, said springs being entirely within the length of the seat to keep them from coming in contact with the clothes of the rider, all combined substantially as set forth.

In testimony whereof I have signed my name to this specification in the presence of two subscribing witnesses.

JAMES WILSON.

Witnesses:
HENRY CHADBOURN,
JOANNA M. DOLLOFF.